3,714,134
MOLECULAR SIZING PROCESS
Jerome Robert Olechowski, Trenton, N.J., assignor to Cities Service Company, New York, N.Y.
No Drawing. Filed Apr. 30, 1971, Ser. No. 139,255
Int. Cl. C08d 5/00, 13/00
U.S. Cl. 260—85.3 R
19 Claims

ABSTRACT OF THE DISCLOSURE

Low molecular weight butyl-type copolymers are prepared by contacting a butyl-type rubber with a catalyst composition comprising a transition metal salt, an organometallic compound of a metal of Group I-A, II-A, II-B, or III-A of the Periodic Table of Elements, and a proton donor. The catalyst composition preferably comprises a halide of tungsten, molybdenum, or rhenium, an alkyl aluminum halide, and a lower alkanol.

BACKGROUND OF THE INVENTION

Field of the invention

This invention relates to low molecular weight butyl-type copolymers and more particularly relates to a process for preparing such copolymers by the molecular sizing of butyl-type rubbers.

Description of the prior art

As disclosed in Enjay Chemical Company's bulletin "LM Butyls—Properties and Applications," dated July 11, 1969, low molecular weight butyl-type copolymers are useful in sealants, coatings, electrical encapsulants, blends, and binders. The commercially-available low molecular weight copolymers are believed to be prepared by a typical butyl polymerization process except for the use of an excess of isoprene and a higher poymerization temperature. It would be desirable to be able to prepare such copolymers from the commercially-available butyl-type rubbers.

SUMMARY OF THE INVENTION

An object of this invention is to prepare low molecular weight butyl-type copolymers from butyl-type rubbers.

Another object is to prepare such low molecular weight copolymers having a higher degree of unsaturation and, consequently, a faster cure rate than the rubbers.

These and other objects are attained by contacting an isobutylene-conjugated polyene copolymer having a combined polyene content of about 1 to 5 mol percent and a viscosity average molecular weight of about 300,000 to 500,000 with a catalyst composition comprising a transition metal salt, an organometallic compound of a metal of Group I-A, II-A, II-B, or III-A of the Periodic Table of Elements, and a proton donor selected from glycols and compounds corresponding to the formula ROH wherein R is hydrogen, alkyl, aryl, alkaryl, or aralkyl and wherein any alkyl group contains up to five carbon atoms and any aryl group is phenyl or naphthyl.

DESCRIPTION OF THE PREFERRED EMBODIMENTS

As indicated above, the butyl-type rubber which is treated in accordance with the present invention may be any isobutylene-conjugated polyene copolymer having a combined polyene content of about 1 to 5 mol percent and a viscosity average molecular weight of about 300,000 to 500,000. The combined polyene units may be derived from any conjugated polyene monomers containing at least four carbon atoms and at least two ethylenic double bonds. Ordinarily, however, the units are derived from one or more aliphatic or cycloaliphatic monomers containing 4 to 18 carbon atoms and 2 to 4 conjugated double bonds, e.g., butadiene, isoprene, piperylene, 2,3-dimethylbutadiene, cyclooctadiene, cyclododecatriene, cyclooctadecatetraene, etc. The copolymers having a content of about 1 to 3 mol percent of a combined aliphatic conjugated diene containing 4 to 6 carbon atoms, especially isoprene, are preferred.

The transition metal salt employed as a component of the catalyst system may be one or more salts of a transition metal such as lanthanum, titanium, zirconium, hafnium, vanadium, niobium, tantalum, chromium, molybdenum, tungsten, manganese, rhenium, ruthenium, osmium, rhodium, iridium, or palladium. Preferably the salt is a halide, more preferably a chloride, but other salts such as the oxyhalides, sulfates, nitrates, phosphates, acetates, propionates, benzoates, acetylacetonates, etc. are also utilizable.

Exemplary of such salts are lanthanum trichloride, titanium tetrachloride, titanium trichloride, zirconium trichloride, hafnium tetrachloride, vanadium oxytrichloride, niobium pentabromide, tantalum pentaiodide, chromic chloride, molybdenum pentachloride, molybdenum pentafluoride, molybdenum hexabromide, molybdenum dichloride, molybdenum oxytetrachloride, molybdenum nitrate, molybdenum acetate, molybdenum propionate, molybdenum benzoate, molybdenum acetylacetonate, molybdenum sulfate, molybdenum phosphate, tungsten hexachloride, tungsten dichloride, tungsten pentabromide, tungsten hexafluoride, tungsten oxytetrachloride, tungsten sulfate, manganese trichloride, rhenium heptachloride, rhenium hexafluoride, rhenium pentachloride, ruthenium sesquichloride, osmium tetrachloride, rhodium sesquichloride, iridic chloride, palladous iodide, etc.

The preferred salts are the halides of tungsten, molybdenum, and rhenium, especially tungsten hexachloride, molybdenum pentachloride, and rhenium pentachloride. Ordinarily the transition metal salt is employed in an amount such as to provide about 0.0002–0.01, preferably about 0.0003–0.0004, mol of transition metal per mol of copolymer being treated.

The organometallic component of the catalyst system may be one or more organometallic compounds of metals of Groups I-A, II-A, II-B, and III-A of the Periodic Table of Elements. [The Periodic Table to which reference is made is Deming's Periodic Table, which may be found in Lange, "Handbook of Chemistry," Ninth Edition, McGraw-Hill Book Company, Inc. (New York—Toronto—London), 1956, pages 56–57.] When the metal of the organometallic compound is multivalent, any valence not satisfied by an organic group may be satisfied by hydrogen, chlorine, bromine, iodine, or fluorine. The organic groups in these compounds are preferably alkyl groups containing 1–10 carbon atoms or aryl groups such as phenyl, tolyl, or naphthyl.

Exemplary of the organometallic compounds are methyl lithium, butyl lithiums, phenyl lithium, naphthyl lithiums, ethyl sodium, propyl potassiums, butyl rubidiums, pentyl cesiums, octyl beryllium chlorides, dimethyl magnesium, methyl magnesium bromide, diethyl calcium, ethyl calcium iodide, dipentyl strontiums, naphthyl strontium fluorides, dipropyl bariums, phenyl barium chloride, dihexyl zincs, ethyl zinc chloride, dioctyl cadmiums, butyl cadmium chlorides, trimethyl borine, phenyl boron dibromide, pentyl gallium bromides, hexyl indium chlorides, heptyl thallium chlorides, trimethyl aluminum, triethyl aluminum, tripropyl aluminums, tributyl aluminums, tripentyl aluminums, trihexyl aluminums, triheptyl aluminums, trioctyl aluminums, trinonyl aluminums, tridecyl aluminums, triphenyl aluminum, trinaphthyl aluminums, tritolyl aluminums, trimethylnaphthyl aluminums, the corresponding hydrocarbyl aluminum hydrides and dihydrides, and the corresponding hydrocarbyl aluminum chlorides, dichlorides, bromides, dibromides, iodides, diiodides, fluorides, and difluorides, etc.

Preferably the organometallic compound is an aluminum compound, more preferably an alkyl aluminum halide, most preferably ethyl aluminum dichloride. The organometallic compound is usually employed in an amount such as to provide an organometallic compound/transition metal salt mol ratio of about 0.5–15, preferably about 0.75–5, most preferably about four.

The proton donor may be one or more compounds selected from glycols and compounds corresponding to the formula ROH wherein R is hydrogen, alkyl, aryl, alkaryl, or aralkyl, and wherein any alkyl group contains up to five carbon atoms and any aryl group is phenyl or naphthyl. Exemplary of such compounds are water, ethylene glycol, propylene glycol, butylene glycol, pentylene glycol, methanol, ethanol, propanol, isopropanol, butanol-1, butanol-2, t-butanol, the pentanols, phenol, alpha- and beta-naphthols, cresols, xylenols, benzyl alcohol, etc. Preferably the proton donor is an alkanol containing 1–5 carbon atoms, especially ethanol. The proton donor is usually employed in an amount such as to provide a proton donor/transition metal salt mol ratio of about 1–6, preferably about 1–3, most preferably about one.

The manner in which the butyl-type rubber is contacted with the catalyst composition is not critical. If desired, the catalyst components may be mixed together and allowed to react with one another before being added to the reaction mixture. However, it is usually preferable to form the catalyst in situ by adding the catalyst components separately to a reaction mixture containing the polymer to be treated. A particularly desirable method is to mix the proton donor with a solution of the transition metal salt in an aromatic hydrocarbon solvent such as benzene, toluene, xylene, etc., add the resultant solution to the polymer, and then add the organometallic compound.

The reaction temperature is preferably maintained in the range of about 20–60° C., room temperature being particularly convenient and satisfactory. Lower temperatures may be used but are less desirable because of the slower reaction rates at such temperatures. Temperatures higher than 60° C. are usually undesirable because they may cause excessive molecular sizing. The reaction may be conducted at atmospheric, subatmospheric, or superatmospheric pressure.

Ordinarily the butyl-type rubber is maintained in contact with the catalyst composition for about 30 seconds to above five hours. Longer contact times are usually undesirable because of the excessive degree of molecular sizing which may be obtained when the contact time exceeds about five hours. When the temperature is maintained at about 20–60° C., contact times in the range of about 30 seconds to about two hours, especially about one hour, have been found to be particularly satisfactory.

The molecular sizing reaction is conducted in the substantial absence of catalyst poisons such as oxygen and carbon dioxide, suitably in an inert atmosphere such as nitrogen, helium, argon, etc. To facilitate temperature control it is usually desirable to conduct the reaction in an inert diluent, e.g., a liquid saturated aliphatic hydrocarbon such as n-hexane, isooctane, cyclohexane, etc., an aromatic hydrocarbon such as benzene, toluene, xylene, etc., or a ring-halogenated aromatic hydrocarbon such as chlorobenzene, chlorotoluene, etc.

When the desired degree of molecular sizing is attained, the reaction may be terminated by any conventional technique, e.g., by the addition of an excess of water, methanol, ethanol, or isopropanol. The product may then be recovered by any conventional technique.

The products of the molecular sizing processes have lower molecular weights than the butyl-type rubbers and vary in consistency from liquids to solids, depending on the degree of molecular sizing. Products of particular interest are those having viscosity average molecular weights of about 50,000–200,000 and higher degrees of unsaturation then butyl-type rubbers from which they were prepared. Such products are useful in sealants, coatings, electrical encapsulants, blends, and binders; and they may be chlorinated to prepare low molecular weight chlorobutyl-type copolymers.

The following examples are given to illustrate the invention and are not intended as a limitation thereof. Unless otherwise specified, quantities mentioned are quantities by weight.

EXAMPLE I

Prepare solution A by dissolving 60 parts of an isobutylene-isoprene copolymer having a viscosity average molecular weight of about 430,000 and a combined isoprene content of about 1.6 mol percent in 400 parts of dry benzene.

Prepare solution B by intimately mixing 0.058 part (1.26 molar proportions) of ethanol with a solution of 0.5 part (1.26 molar proportions) of tungsten hexachloride in 35 parts of anhydrous benzene.

Prepare solution C by dissolving 0.64 part (5.04 molar proportions) of ethyl aluminum dichloride in hexane to form a 20% solution.

Purge a suitable reaction vessel with nitrogen and charge it with the copolymer solution. Heat the solution to 50° C. and stir. To the stirred solution add solution B and then solution C. Thirty seconds after the addition of solution C, add methanol to hydrolyze the catalyst. Isolate the reaction product by precipitation from a large excess of isopropanol, redissolve it in benzene, and recover it by vacuum stripping of the solvent.

The process results in a quantitative yield of a sized copolymer having a viscosity average molecular weight of about 143,000 and a degree of unsaturation of about 2.3 mol percent.

EXAMPLE II

Repeat Example I except as follows:

(1) Prepare solution B by intimately mixing 0.063 part (1.37 molar proportions) of ethanol with a solution of 0.5 part (1.37 molar proportions) of rhenium pentachloride in 35 parts of anhydrous benzene.

(2) Prepare solution C by dissolving 0.69 part (5.48 molar proportions) of ethyl aluminum dichloride in hexane to form a 20% solution.

The process results in a quantitative yield of a sized copolymer having a viscosity average molecular weight of about 81,000 and a degree of unsaturation of about 2.7 mol percent.

EXAMPLE III

Repeat Example I except as follows:

(1) Prepare solution B by intimately mixing 0.084 part (1.83 molar proportions) of ethanol with a solution of 0.5 part (1.83 molar proportions) of molybdenum pentachloride in 35 parts of anhydrous benzene.

(2) Prepare solution C by dissolving 0.93 part (7.32 molar proportions) of ethyl aluminum dichloride in hexane to form a 20% solution.

The process results in a quantitative yield of a sized copolymer having a viscosity average molecular weight of about 71,000 and a degree of unsaturation of about 2.4 mol percent.

EXAMPLE IV

Repeat Example I except as follows:

(1) Prepare solution B by intimately mixing 0.029 part (0.63 molar proportion) of ethanol with a solution of 0.25 part (0.63 molar proportion) of tungsten hexachloride in 35 parts of anhydrous benzene.

(2) Prepare solution C by dissolving 0.32 part (2.52 molar proportions) of ethyl aluminum dichloride in hexane to form a 20% solution.

(3) Conduct the reaction at room temperature for 30 minutes.

The process results in a quantitative yield of a sized copolymer having a viscosity average molecular weight of about 149,000 and a degree of unsaturation higher than that of the starting material.

EXAMPLE V

Repeat Example I except as follows:

(1) Prepare solution A by dissolving 60 parts of an isobutylene-isoprene copolymer having a viscosity average molecular weight of about 370,000 and a combined isoprene content of about one mol percent in 400 parts of dry benzene.

(2) Conduct the reaction at room temperature for one hour.

The process results in a quantitative yield of a sized copolymer having a lower molecular weight and a higher degree of unsaturation than the starting material.

Similar results are observed when the materials specified in the foregoing examples are replaced by materials taught in the specification to be equivalents thereof.

It is obvious that many variations can be made in the products and processes set forth above without departing from the spirit and scope of this invention.

What is claimed is:

1. A molecular sizing process which comprises contacting an isobutylene-conjugated polyene copolymer having a combined polyene content of about 1–5 mol percent and a viscosity average molecular weight of about 300,000–500,000 with a catalyst composition comprising one molar proportion of a salt of a transition metal selected from lanthanum, titanium, zirconium, hafnium, vanadium, niobium, tantalum, chromium, molybdenum, tungsten, manganese, rhenium, ruthenium, osmium, rhodium, iridium, and palladium, about 0.5–15 molar proportions of an organometallic compound of a metal of Group I–A, II–A, II–B, or III–A of the Periodic Table of Elements, and about 1–6 molar proportions of a proton donor selected from glycols and compounds corresponding to the formula ROH wherein R is hydrogen, alkyl, aryl, alkaryl, or aralkyl, any alkyl group containing up to 5 carbon atoms and any aryl group being phenyl or naphthyl.

2. The process of claim 1 wherein the copolymer is contacted with the catalyst composition for about 30 seconds to about five hours at a temperature in the range of about 20–60° C.

3. The process of claim 2 wherein the copolymer is contacted with the catalyst composition for about one hour at about room temperature.

4. The process of claim 1 wherein the conjugated polyene is an aliphatic conjugated diene containing 4–6 carbon atoms.

5. The process of claim 4 wherein the conjugated diene is isoprene.

6. The process of claim 4 wherein the conjugated diene is butadiene.

7. The process of claim 1 wherein the catalyst composition consists essentially of one molar proportion of the transition metal salt, about 0.75–5 molar proportions of the organometallic compound, and about 1–3 molar proportions of the proton donor.

8. The process of claim 7 wherein the catalyst composition consists essentially of one molar proportion of the transition metal salt, about four molar proportions of the organometallic compound, and about one molar proportion of the proton donor.

9. The process of claim 1 wherein the transition metal salt is a halide of tungsten, molybdenum, or rhenium.

10. The process of claim 9 wherein the transition metal salt is tungsten hexachloride.

11. The process of claim 9 wherein the transition metal salt is molybdenum pentachloride.

12. The process of claim 1 wherein the organo-metallic compound is an aluminum compound.

13. The process of claim 12 wherein the aluminum compound is an alkyl aluminum halide.

14. The process of claim 13 wherein the alkyl aluminum halide is ethyl aluminum dichloride.

15. The process of claim 1 wherein the proton donor is an alkanol containing 1–5 carbon atoms.

16. The process of claim 15 wherein the alkanol is ethanol.

17. A molecular sizing process which comprises contacting an isobutylene-isoprene copolymer having a combined isoprene content of about 1–3 mol percent and a viscosity average molecular weight of about 300,000–500,000 with a catalyst composition consisting essentially of one molar proportion of a halide of tungsten, molybdenum, or rhenium, about 0.75–5 molar proportions of an alkyl aluminum halide, and about 1–3 molar proportions of an alkanol containing 1–5 carbon atoms, and maintaining the copolymer in contact with the catalyst composition for about one hour at about room temperature.

18. The process of claim 17 wherein the catalyst composition consists essentially of one molar proportion of tungsten hexachloride, about four molar proportions of ethyl aluminum dichloride, and about one molar proportion of ethanol.

19. The process of claim 17 wherein the catalyst composition consists essentially of one molar proportion of molybdenum pentachloride, about four molar proportions of ethyl aluminum dichloride, and about one molar proportion of ethanol.

References Cited

UNITED STATES PATENTS

| | | | |
|---|---|---|---|
| 3,192,192 | 6/1965 | Hartnett | 260—93.7 |
| 3,211,710 | 10/1965 | Hendriks et al. | 260—85.3 |
| 3,562,804 | 2/1971 | Powers | 260—85.3 |

JAMES A. SEIDLECK, Primary Examiner

A. HOLLER, Assistant Examiner

U.S. Cl. X.R.

260—88.2 S